United States Patent
Moussaoui

(10) Patent No.: US 6,903,914 B1
(45) Date of Patent: Jun. 7, 2005

(54) DC-DC CONVERTER HAVING ACTIVE TRANSIENT RESPONSE COMPENSATION CIRCUIT EMPLOYING FLYBACK INDUCTOR

(75) Inventor: Zaki Moussaoui, Palm Bay, FL (US)

(73) Assignee: Intersil Americas, Inc., Milpitas, CA (US)

( * ) Notice: Subject to any disclaimer, the term of this patent is extended or adjusted under 35 U.S.C. 154(b) by 8 days.

(21) Appl. No.: 10/725,752

(22) Filed: Dec. 2, 2003

(51) Int. Cl.⁷ .............................................. H02H 7/122
(52) U.S. Cl. ........................ 361/111; 361/18; 363/22; 363/56.02
(58) Field of Search ..................... 361/111, 18; 363/22, 363/56.02, 56.05

(56) References Cited

U.S. PATENT DOCUMENTS

| | | | |
|---|---|---|---|
| 3,652,919 A | * 3/1972 | Harrigan | 327/535 |
| 3,867,683 A | * 2/1975 | Marchevka | 363/22 |
| 4,245,270 A | 1/1981 | Busby | 361/58 |
| 4,390,937 A | * 6/1983 | Clark, Jr. | 331/113 A |
| 5,122,726 A | * 6/1992 | Elliott et al. | 361/18 |
| 5,162,981 A | * 11/1992 | Lazar et al. | 331/113 A |
| 5,177,371 A | 1/1993 | Faulk | 307/66 |
| 5,224,010 A | 6/1993 | Tran et al. | 361/90 |
| 5,262,680 A | 11/1993 | Hu | 307/130 |
| 5,448,441 A | 9/1995 | Raposa | 361/18 |
| 5,502,370 A | 3/1996 | Hall et al. | 323/284 |
| 5,528,167 A | 6/1996 | Samela et al. | 326/30 |
| 5,539,910 A | 7/1996 | Brueckmann et al. | 395/750 |
| 5,548,502 A | * 8/1996 | Kosugi | 363/22 |
| 5,926,384 A | 7/1999 | Jochum et al. | 363/56 |
| 6,359,796 B2 | 3/2002 | Hartular et al. | |
| 6,400,584 B1 | * 6/2002 | Sabate et al. | 363/22 |
| 6,584,418 B2 | 6/2003 | Murphy et al. | 702/60 |
| 6,693,784 B1 | * 2/2004 | Zansky et al. | 361/111 |

* cited by examiner

Primary Examiner—Bao Q. Vu
(74) Attorney, Agent, or Firm—Lowell W. Gresham; Jordan M. Meschkow; Meschkow & Gresham, P.L.C.

(57) ABSTRACT

A DC-DC converter has an output bus coupled to power a load. A voltage transient compensation circuit has a first switch between a voltage input bus and the output bus, and a second switch between the output bus and a flyback transformer coupled to a reference voltage terminal. When the voltage on the output bus drops below a first threshold, the first switch couples and thereby transfers energy from the voltage input bus to the voltage output bus and the load. When the voltage on the output bus exceeds a second threshold, the second switch is closed, transferring energy from the output bus to an input winding of the flyback transformer. When the voltage on the output bus drops back in a range between the two thresholds, the second switch is opened, and the flyback transformer transfers stored energy back to the voltage input bus.

10 Claims, 1 Drawing Sheet

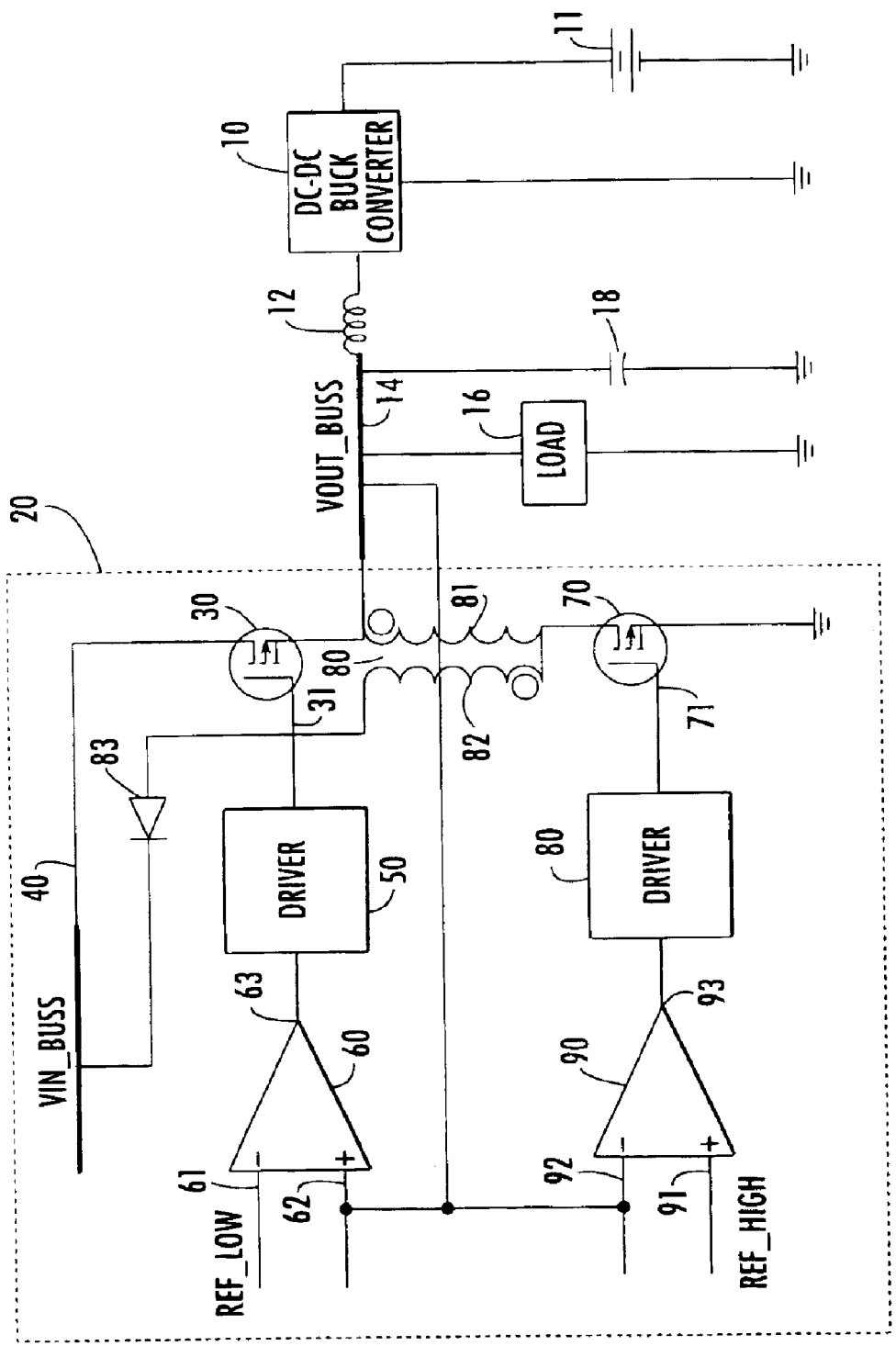

DC-DC CONVERTER HAVING ACTIVE TRANSIENT RESPONSE COMPENSATION CIRCUIT EMPLOYING FLYBACK INDUCTOR

FIELD OF THE INVENTION

The present invention relates electronic circuits and components therefor, and is particularly directed a circuit for monitoring the output of a DC-DC converter and controllably sourcing or sinking energy with respect thereto in response to a change in load voltage.

BACKGROUND OF THE INVENTION

DC-DC converters used in dynamic powering applications, such as notebook computers and the like, are subject to substantial load transients. For example, when the processor of a personal computer goes into 'sleep' mode, switching off of various circuits may generate substantial excess current transients. Conversely, when the processor is caused to transition or wake up from quiescent mode, large current demands on the order of up to several hundred amps per second may be produced. One way to handle the problem is to connect a relatively large number of electrolytic capacitors in parallel with the converter output. In addition to entailing an added expense, the capacitors typically have a fairly large circuit board occupancy footprint and volume, so that, collectively, they can occupy a substantial portion of the circuit installation volume within a notebook or other personal computer.

Advantageously, this transient problem has been successfully addressed by the invention disclosed in the U.S. Patent to Jochum et al, U.S. Pat. No. 5,926,384 (hereinafter referred to as the '384 patent), assigned to the assignee of the present application, and the disclosure of which is incorporated herein. Pursuant to the invention disclosed in the '384 patent, relatively fast current transients at the load are compared to reference threshold (e.g., a one percent deviation from average). Using a linear circuit, if the threshold is exceeded, one of a current source and a current sink switch coupled to the load is turned on so as to overcome the transient anomaly.

SUMMARY OF THE INVENTION

The present invention is directed to a somewhat similar but different mechanism for handling load transients, in that like the '384 patent, it uses a pair of thresholds for taking action; however, it does so without employing a linear operation in the current supply or current sinking path as in the '384 patent, and thereby provides a high efficiency mechanism for compensating for the transient. In accordance with the present invention, rather limiting the transient to very short or 'spike' changes in load current, the present invention compares the output voltage produced by the converter with a pair of upper and lower voltage thresholds.

If the output voltage deviation is smaller than a prescribed differential, an upper (MOSFET) switch, whose source-drain path is connected between the converter output and a voltage source, is turned on, so as to immediately bring up the output or load voltage to within the intended operational voltage output window. On the other hand, if the output voltage deviation is larger than a given differential, a current sinking (MOSFET) switch is turned on to sink current from the output. In order to conserve energy, this current sinking operation takes place through a first inductor winding of a flyback transformer, which stores energy when the current sinking switch is turned on. When the current sinking switch is subsequently turned off, the stored energy is returned to the source by way of a second, flyback inductor winding of the flyback transformer that is mutually. coupled to the first winding. Namely, rather than simply bleed off or waste excess energy, the use of the flyback transformer serves to conserve energy when sinking energy from the converter's output.

BRIEF DESCRIPTION OF THE DRAWINGS

The single FIGURE diagrammatically illustrates a DC-DC converter employing the transient response compensation circuit in accordance with the present invention.

DETAILED DESCRIPTION

Attention is now directed to the single FIGURE of the drawings wherein a DC-DC converter employing the transient response compensation circuit in accordance with the present invention is diagrammatically illustrated as comprising a conventional buck or step-down, DC-to-DC converter 10 connected to a power source V such as a rechargeable battery 11. DC-to-DC converter 10 has its output terminal coupled by way of an inductor 12 to an output bus (Vout__Buss) 14, to which a load 16 (such as a microprocessor) is coupled in parallel with a load capacitor 18. Pursuant to the invention the output bus 14 is further coupled to a transient response compensation circuit referenced briefly above and shown within broken lines 20.

More particularly, the transient response compensation circuit according to the present invention comprises a first, or upper (MOSFET) switch 30 having its source-drain path coupled in series between an voltage input or supply bus (Vin__Buss) 40 and the output bus 14. MOSFET 30 has its gate 31 coupled to the output of a driver circuit 50 which, in turn, is coupled to output 63 of a first, undervoltage comparator 60. Undervoltage comparator 60 has a first, inverting (−) input 61 coupled to a prescribed low reference voltage threshold, and a second, non-inverting (+) input 62 coupled to the voltage output bus 14. Undervoltage comparator 60 serves to compare the voltage on the output bus 14 with the low reference voltage threshold Ref__Low. As long as the voltage on the output bus 14 is greater than this threshold, the output 63 of comparator 60 remains in a first state that maintains MOSFET switch 30 turned off. However, if the voltage on the output bus 14 drops below the low reference voltage threshold, comparator 60 is tripped, turning on MOSFET switch 30, and thereby connecting the input voltage supply bus 40 to the output bus 14.

Transient response compensation circuit 20 further includes a second, or lower (MOSFET) switch 70, having its source-drain path coupled in series with a first inductor 81 of a flyback transformer 80 between a reference voltage (e.g., ground) and the output bus 14. Flyback transformer 80 further includes a second inductor 82, which is coupled by way of a diode 83 to the input voltage supply bus 40. MOSFET 70 has its gate 71 coupled to the output of a driver circuit 80 which, in turn, is coupled to output 93 of a second, overvoltage comparator 90. Overvoltage comparator 60 has a first, noninverting (+) input 91 coupled to a prescribed high reference voltage threshold Ref__High, and a second, inverting (31) input 92 coupled to the voltage output bus 14. In a complementary manner to the undervoltage comparator 60, overvoltage comparator 90 serves to compare the voltage on the output bus 14 with the high reference voltage threshold.

As long as the voltage on the output bus 14 is less than this threshold, the output 93 of comparator 90 remains in a first state that maintains MOSFET switch 70 turned off. However, if the voltage on the output bus 14 exceeds the high reference voltage threshold, comparator 90 is tripped, turning on MOSFET switch 70, and thereby connecting the output bus 14 through the inductor 81 to ground.

In operation, as long as the voltage on voltage output bus 14 remains between the upper and lower threshold voltages Ref_Low and Ref_High (to which threshold comparators 30 and 70 are respectively referenced), the outputs of each of these comparators remain in a first state and neither of MOSFET switches 30 and 70 is turned on. However, if the output voltage drops to a value less than the lower threshold voltage Ref_Low, comparator 60 is tripped and turns on the upper (MOSFET) switch 30. This serves to immediately connect the output bus 14 to the input voltage supply bus 40, thereby supplying energy to the load, as required. When the output voltage eventually comes back up to a value that falls within the window defined by the lower threshold voltage Ref_Low and the upper threshold voltage Ref_High, comparator 60 changes state, thereby terminating the gate drive to MOSFET switch 30, so that MOSFET switch 30 is turned off, and the coupling of the input voltage bus 40 to the output bus 14 is terminated.

In a complementary manner, if the output voltage increases to a value that exceeds the upper lower threshold voltage Ref_High, comparator 90 is tripped and turns on the lower (MOSFET) switch 70. This serves to connect the output bus 14 to ground through the inductor 81 of flyback transformer 80, so that current flows from the output bus into the inductor 81 causing inductor 81 to store energy. When the output voltage drops back up to a value that falls within the window defined by the lower threshold voltage Ref_Low and the upper threshold voltage Ref_High, comparator 90 changes state, thereby terminating the gate drive to MOSFET switch 70, so that MOSFET switch 70 is turned off and the coupling of the output bus 14 through inductor 81 to ground is terminated. With the circuit path through the MOSFET switch 70 interrupted, energy stored in inductor 81 is mutually coupled into inductor 82 and current now flows from the inductor 82 through diode 83 and into input voltage bus 40. Thus, rather than simply bleed off or waste excess energy, the use of flyback transformer 80 serves to conserve energy when sinking energy from the converter's output.

While I have shown and described an embodiment in accordance with -the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. A voltage transient compensation circuit for use with a DC-DC converter having a voltage output bus to which a load powered by said DC-DC converter is coupled, comprising:

a first switch circuit coupled between a voltage input bus and said voltage output bus and being operative, in response to a voltage on said voltage output bus dropping below a first threshold, to couple said voltage input bus to said voltage output bus, and thereby transfer energy from said voltage input bus to said voltage output bus and said load; and a second switch circuit, coupled between said voltage output bus and a flyback circuit coupled to a reference voltage terminal and to said voltage input bus, and being operative, in response to a voltage on said voltage output bus exceeding a second threshold, higher than said first threshold, to couple said voltage output bus to said flyback circuit, so as to couple energy from said voltage output bus into said flyback circuit, and wherein, in response to said voltage on said voltage output bus dropping to less than said second threshold, said flyback circuit is operative to transfer energy stored therein to said voltage input bus.

2. The voltage transient compensation circuit according to claim 1, wherein said flyback circuit comprises a flyback transformer having a first inductor winding coupled between said voltage output bus and said second switch circuit, and a second inductor winding mutually coupled with said first inductor winding, and being coupled between said second switch circuit and said voltage input bus.

3. The voltage transient compensation circuit according to claim 2, wherein said first switch circuit comprises a first MOSFET coupled between said voltage input bus and said voltage output bus, and a first comparator having a first input coupled to a first voltage corresponding to said first threshold and a second input coupled to said voltage output bus, said first comparator having an output coupled to control the operation of said first MOSFET.

4. The voltage transient compensation circuit according to claim 3, wherein said second switch circuit comprises a second MOSFET coupled between said voltage output bus and said first inductor winding, and a second comparator having a first input coupled to a second voltage corresponding to said second threshold and a second input coupled to said voltage output bus, said second comparator having an output coupled to control the operation of said second MOSFET.

5. A voltage transient compensation circuit for use with a DC-DC converter having a voltage output bus to which a load powered by said DC-DC converter is coupled, comprising:

a current supply circuit coupled between a current supply and said voltage output bus and being operative, in response to a voltage on said voltage output bus dropping below a first threshold, to couple said current supply to said voltage output bus, and thereby supply current to said voltage output bus and said load; and a current sinking circuit, coupled between said voltage output bus and said current supply, and being operative, in response to a voltage on said voltage output bus exceeding a second threshold, higher than said first threshold, to couple energy from said voltage output bus into said flyback circuit, and wherein, in response to said voltage on said voltage output bus dropping to less than said second threshold, said flyback circuit is operative to transfer energy stored therein to said current supply.

6. The voltage transient compensation circuit according to claim 5, wherein said current supply circuit comprises a first switch circuit coupled between said voltage input bus and said voltage output bus, and a first comparator having a first input coupled to a first voltage corresponding to said first threshold and a second input coupled to said voltage output bus, said first comparator having an output coupled to control the operation of said first switch circuit.

7. The voltage transient compensation circuit according to claim 6, wherein said current sinking circuit comprises a second switch circuit coupled between said voltage output bus and said first inductor winding, and a second comparator having a first input coupled to a second voltage corresponding to said second threshold and a second input coupled to said voltage output bus, said second comparator having an output coupled to control the operation of said second switch circuit.

8. The voltage transient compensation circuit according to claim 7, wherein said flyback circuit comprises a flyback transformer having a first inductor winding coupled between said voltage output bus and said second switch circuit, and a second inductor winding mutually coupled with said first inductor winding, and being coupled between said second switch circuit and said current supply.

9. For use with a DC-DC converter having a voltage output bus to which a load powered by said DC-DC converter is coupled, a method for compensating for a voltage transient on said voltage output bus, comprising the steps of:

(a) in response to a voltage on said voltage output bus dropping below a first threshold, coupling a current supply to said voltage output bus, and thereby supplying current to said voltage output bus and said load; and (b) in response to a voltage on said voltage output bus exceeding a second threshold, higher than said first threshold, coupling said voltage output bus to a flyback circuit and wherein, in response to said voltage on said voltage output bus dropping to less than said second threshold, causing said flyback circuit to transfer energy stored therein to said current supply.

10. The method according to claim 9, wherein said flyback circuit comprises a flyback transformer having a first inductor winding coupled between said voltage output bus and a voltage reference terminal, and a second inductor winding mutually coupled with said first inductor winding, and being coupled to said current supply.

* * * * *